United States Patent
Lee

(10) Patent No.: US 9,800,745 B2
(45) Date of Patent: Oct. 24, 2017

(54) CAMERA SYSTEM AND METHOD OF CONTROLLING THE SAME

(71) Applicant: Hanwha Techwin Co., Ltd., Changwon-si (KR)

(72) Inventor: Joonsung Lee, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 143 days.

(21) Appl. No.: 14/950,089

(22) Filed: Nov. 24, 2015

(65) Prior Publication Data

US 2016/0234420 A1 Aug. 11, 2016

(30) Foreign Application Priority Data

Feb. 10, 2015 (KR) .................. 10-2015-0020295

(51) Int. Cl.
| | |
|---|---|
| H04N 1/00 | (2006.01) |
| H04N 7/18 | (2006.01) |
| H04W 76/02 | (2009.01) |
| H04W 48/16 | (2009.01) |
| H04W 88/16 | (2009.01) |

(52) U.S. Cl.
CPC ......... *H04N 1/00315* (2013.01); *H04N 7/185* (2013.01); *H04W 76/027* (2013.01); *H04W 48/16* (2013.01); *H04W 88/16* (2013.01)

(58) Field of Classification Search
None
See application file for complete search history.

(56) References Cited

U.S. PATENT DOCUMENTS

| 8,193,933 B2 | 6/2012 | Jezierski et al. | |
|---|---|---|---|
| 2004/0028003 A1* | 2/2004 | Diener | H04L 1/0001 370/319 |
| 2006/0045034 A1* | 3/2006 | Kwon | H04W 36/06 370/310 |
| 2009/0073925 A1* | 3/2009 | Rentel | H04W 72/082 370/329 |

(Continued)

FOREIGN PATENT DOCUMENTS

| JP | 2012-160932 A | 8/2012 |
|---|---|---|
| KR | 10-2010-0091571 A | 8/2010 |

(Continued)

*Primary Examiner* — Shahbaz Nazrul
(74) *Attorney, Agent, or Firm* — Sughrue Mion, PLLC

(57) ABSTRACT

A camera system including a camera and a gateway connected to the gateway through a channel is provided. The camera includes: a radio frequency (RF) module connected to the gateway through the channel, and configured to receive a beacon periodically sent from the gateway, the beacon including channel information about a next channel to which the channel is to be changed for connecting the camera and the gateway; and a controller configured to determine whether the beacon is received at the RF module, and change the channel to another channel based on at least one of: a predetermined order of a plurality of channels including the other channel; a status of receiving the beacon at the RF module; and a channel check response received from the gateway in response to a channel check request sent from the radio frequency module, the channel check response comprising channel information about one of the plurality of channels.

20 Claims, 16 Drawing Sheets

(56) References Cited

U.S. PATENT DOCUMENTS

| | | | |
|---|---|---|---|
| 2010/0302994 A1* | 12/2010 | Tachtatzis | H04W 36/06 370/315 |
| 2015/0063213 A1 | 3/2015 | Laroia et al. | |
| 2015/0098377 A1* | 4/2015 | Amini | H04W 52/0209 370/311 |
| 2015/0131570 A1 | 5/2015 | Kwon et al. | |
| 2016/0165465 A1* | 6/2016 | Park | H04W 24/00 370/331 |

FOREIGN PATENT DOCUMENTS

| | | |
|---|---|---|
| KR | 10-0979400 B1 | 9/2010 |
| KR | 10-2013-0139791 A | 12/2013 |

* cited by examiner

FIG. 2

| [index] | CH | [index] | CH | [index] | CH |
|---|---|---|---|---|---|
| [1] | 02 | [6] | 55 | [11] | 39 |
| [2] | 09 | [7] | 71 | [12] | 14 |
| [3] | 36 | [8] | 26 | [13] | 51 |
| [4] | 41 | [9] | 91 | [14] | 23 |
| [5] | 44 | [10] | 07 | [15] | 88 |

FIG. 5

| | Preamble | Address | Length | head (CMD) | Payload | | | |
|---|---|---|---|---|---|---|---|---|
| | | | | | CAM ID | Time stamp | dwell time | next RF ch | CRC |
| size[byte] | 1 | 5 | 1 | 1 | 1 | 1 | 1 | 1 | 2 |

FIG. 12

|  | Preamble | Address | Length | head (CMD) | Payload CAM ID | CRC |
|---|---|---|---|---|---|---|
| size[byte] | 1 | 5 | 1 | 1 | 1 | 2 |

FIG. 13

| | Preamble | Address | Length | head (CMD) | Payload | | | | CRC |
|---|---|---|---|---|---|---|---|---|---|
| | | | | | CAM ID | Time stamp | dwell time | next RF ch | |
| size[byte] | 1 | 5 | 1 | 1 | 1 | 1 | 1 | 1 | 2 |

FIG. 15

| Preamble | Address | Length | head (CMD) | Payload | | | | | CRC |
|---|---|---|---|---|---|---|---|---|---|
| | | | | CAM ID | Time stamp | dwell time | RF ch [index] | RF ch | |
| 1 | 5 | 1 | 1 | 1 | 1 | 1 | 1 | 1 | 2 | size[byte]

FIG. 16

| Preamble | Address | Length | head (CMD) | Payload | | | CRC |
|---|---|---|---|---|---|---|---|
| | | | | CAM ID | RF ch [index] | RF ch | |
| 1 | 5 | 1 | 1 | 1 | 1 | 1 | 2 | size[byte]

CAMERA SYSTEM AND METHOD OF CONTROLLING THE SAME

CROSS-REFERENCE TO THE RELATED APPLICATION

This application claims the benefit of Korean Patent Application No. 10-2015-0020295, filed on Feb. 10, 2015, in the Korean Intellectual Property Office, the disclosure of which is incorporated herein in its entirety by reference.

BACKGROUND

1. Field

Apparatuses and methods consistent with exemplary embodiments relate to a camera system and a method of controlling the same.

2. Description of the Related Art

Generally, in a surveillance system that includes a network camera, the network camera transmits an image to a management device and, the management device controls the network camera based on the received image. The management device may communicate with a plurality of network cameras through a network.

The surveillance system may operate the network camera and a gateway using the same Internet protocol (IP) protocol in order to perform communication through a wireless network.

SUMMARY

Exemplary embodiments of the inventive concept provide a camera system and a method of controlling the same.

Various aspects of the exemplary embodiments will be set forth in part in the description which follows and, in part, will be apparent from the description, or may be learned by practice of the presented embodiments.

According to an aspect of an exemplary embodiment, there is provided a camera system which includes a camera and a gateway connected to the camera through a channel. The camera may include: a radio frequency (RF) module connected to a gateway through a channel, and configured to receive, from the gateway, a beacon including channel information about a next channel for connection to the gateway; and a controller configured to compare a number of beacon reception failures with a reference number in response to failing to receive the beacon at the RF module, set the channel to a predetermined channel for connection to the gateway if the number of beacon reception failures is greater than or equal to the reference number, and change the channel to the next channel in response to receiving the beacon.

The predetermined channel may be a channel with lowest interference from among a plurality of channels for connection to the gateway.

The camera system may further include a memory configured to store channel information about a plurality of channels for connection to the gateway in a predetermined order of the plurality of channels, and, in response to the receiving the beacon, the controller may change the channel to another channel among the plurality of channels in the predetermined order.

After setting the channel to the predetermined channel, if the RF module receives the beacon including channel information about a channel next to the predetermined channel according to the channel information about the plurality of channels, the controller may change the predetermined channel to the channel next to the predetermined channel.

The reference number may be equal to or less than a number of the plurality of channels.

The channel information about the plurality of channels may be updated such that the predetermined order is changed or an existing channel among the plurality of channel is replaced by a different channel not included in the plurality of channels.

The controller may apply the updated channel information for connection to the gateway after the channel is changed to the last channel among the plurality of channels in the predetermined order.

The controller may transmit a channel check request to the gateway in response to failing to receive the beacon, receive a channel check response that corresponds to the channel check request from the gateway through the RF module, and change the channel according to channel information about a different channel included in the channel check response.

The controller may transmit the channel check request and receive the channel check response within a beacon interval time.

If the number of beacon reception failures is less than the reference number, the controller may change the channel to another channel in a predetermined order of a plurality of channels.

The camera system may further include a gateway which stores a channel table including channel information about the plurality of channels in the predetermined order, and the gateway may transmit the beacon to the RF module based on the channel table.

According an aspect of an exemplary embodiment, there is provided a camera which may include: a radio frequency (RF) module connected to a gateway through a channel, and configured to receive a beacon periodically sent from the gateway, the beacon including channel information about a next channel to which the channel is to be changed for connecting the camera and the gateway; and a controller configured to determine whether the beacon is received at the RF module, and change the channel to another channel based on at least one of: a predetermined order of a plurality of channels including the other channel; a status of receiving the beacon at the RF module; and a channel check response received from the gateway in response to a channel check request sent from the radio frequency module, the channel check response including channel information about one of the plurality of channels.

The controller may further determine a number of failures in receiving the beacon, and change the channel to the other channel in a different manner according to the number of failures.

If the number of failures is less than a reference number, the controller may change the channel to the other channel in the predetermined order of the plurality of channels, and, if the number of failures is greater than or equal to the reference number, the controller may set the channel to a predetermined channel among the plurality of channels until the beacon comprising channel information about the predetermined channel is received at the RF module.

The controller may determine occurrence of at least one failure in receiving the beacon, and, if the controller determines the occurrence of the failure, the controller may change the channel to one of: a predetermined channel selected from among the plurality of channels; a channel which is to be selected according to the predetermined order when the failure does not occur; and the one of the plurality of channels of which the channel information is included the channel check response.

The controller may further update the channel information about the plurality of channels such that the predetermined order is changed or an existing channel among the plurality of channel is replaced by a different channel not included in the plurality of channels.

According to an aspect of an exemplary embodiment, there is provided a method of changing a channel through which a camera is connected to a gateway. The method may include: receiving a beacon which is periodically sent from the gateway and includes channel information about a next channel to which the channel is to be changed for connecting the camera and the gateway; and determining whether the beacon is received at the RF module, and changing the channel to another channel based on at least one of: a predetermined order of a plurality of channels including the other channel; a status of receiving the beacon at the RF module; and a channel check response received from the gateway in response to a channel check request sent from the radio frequency module, the channel check response comprising channel information about one of the plurality of channels.

The method may further include: determining a number of failures in receiving the beacon; and changing the channel to the other channel in a different manner according to the number of failures.

If the number of failures is less than a reference number, the channel is changed to the other channel in the predetermined order of the plurality of channels, and, if the number of failures is greater than or equal to the reference number, the channel is set to a predetermined channel among the plurality of channels until the beacon comprising channel information about the predetermined channel is received at the RF module.

The method may further include determining occurrence of at least one failure in receiving the beacon. In response to determining that the occurrence of the failure, the channel may be changed to one of: a predetermined channel selected from among the plurality of channels; a channel which is to be selected according to the predetermined order when the failure does not occur; and the one of the plurality of channels of which the channel information is included the channel check response.

The exemplary embodiments may provide a camera system and a method of controlling the same that effectively avoid wireless interference by normally changing a channel.

BRIEF DESCRIPTION OF THE DRAWINGS

These and/or other aspects will become apparent and more readily appreciated from the following description of the embodiments, taken in conjunction with the accompanying drawings, in which:

FIG. 2 is a diagram for explaining a channel table, according to an exemplary embodiment;

FIG. 5 is a diagram for explaining a packet configuration of a beacon, according to an exemplary embodiment;

FIG. 12 is a diagram illustrating a packet configuration for a channel check request, according to an exemplary embodiment;

FIG. 13 is a diagram illustrating a packet configuration for a channel check response, according to an exemplary embodiment;

FIG. 15 is a diagram illustrating a packet configuration for channel update, according to an exemplary embodiment; and FIG. 16 is a diagram illustrating a packet configuration for channel update, according to another exemplary embodiment.

DETAILED DESCRIPTION OF THE EXEMPLARY EMBODIMENTS

Figure 1:
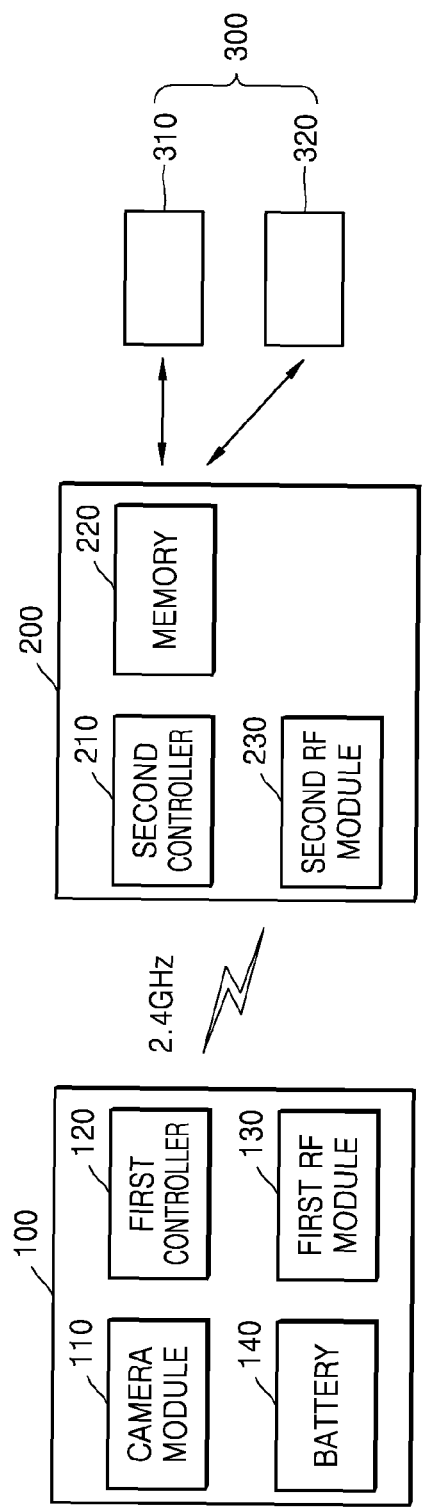
FIG. 1 is a block diagram illustrating a camera system according to an exemplary embodiment.

As the inventive concept allows for various changes and numerous embodiments, exemplary embodiments will be illustrated in the drawings and described in detail in the written description. Effects and characteristics of the present exemplary embodiments, and a method of accomplishing them will be apparent by referring to content described below in detail together with the drawings. However, the inventive concept is not limited to exemplary embodiments below and may be implemented in various forms.

Hereinafter, the inventive concept will be described more fully with reference to the accompanying drawings, in which exemplary embodiments of the inventive concept are shown. When description is made with reference to the drawings, like reference numerals in the drawings denote like or corresponding elements, and repeated description thereof will be omitted.

FIG. 1 is a block diagram illustrating a camera system, according to an exemplary embodiment.

Referring to FIG. 1, the camera system according to an exemplary embodiment may include a network camera 100, a gateway 200, and a monitoring device 300. For clarity, FIG. 1 illustrates only components related to the present exemplary embodiment. Therefore, one of ordinary skill in the art will understand that the camera system may further include other components besides the components illustrated in FIG. 1.

According to an exemplary embodiment, the network camera 100 communicates with the gateway 200 through a radio frequency band such as an industry-science-medical (ISM) band. The ISM band has a frequency range of about 2.4 to about 2.5 GHz and a bandwidth of about 100 MHz.

When use of wireless local area networks (LANs) increases, interference between networks that use the same frequency band increases. The interference between the networks may be minimized by using frequency hopping. Frequency hopping may include a method of detecting whether channel interference occurs through energy scan based on received signal strength indication (RSSI) and a method of avoiding channel interference by periodically performing random channel hopping.

The network camera 100 may include a camera module 110, a first controller 120, a first radio frequency (RF) module 130, and a battery 140.

The camera module 110 captures an image of a monitored region. Although not shown, the camera module 110 may include other components such as a lens, an aperture, an image pickup device, and an image processor. The camera module 110 may change or magnify the image of the monitored region by performing pan/tilt/zoom operations, etc.

The first controller 120 may control an overall operation of the network camera 100.

The first controller 120 may periodically change a channel. The first controller 120 may change a channel in a predetermined order such as an order determined in advance and/or based on a beacon received from the gateway 200.

Accordingly, when failing to receive the beacon from the gateway 200, the first controller 120 may compare a number of beacon reception failures with a reference number such as a number determined in advance, and when the number of beacon reception failures is equal to or greater than the reference number, may stop the channel change, and set the channel to a predetermined channel. When receiving the beacon, the first controller 120 may change the channel again. The first controller 120 may randomly determine the predetermined channel, or determine a channel with lowest interference as the predetermined channel, but the exemplary embodiment is not limited thereto. Alternatively, the first controller 120 may change a channel by requesting the gateway 200 to perform channel checking and receiving a channel check response that corresponds to the channel check request from the gateway 200.

The first RF module 130 may communicate with a second RF module 230 of the gateway 200 using an IP protocol. The first RF module 130 may transmit a signal to the gateway 200 and receive a signal from the gateway 200 under control of the first controller 120. For example, the first RF module 130 may transmit a channel check request signal, an image signal, etc. to the gateway 200, and receive a beacon, a channel check response signal, etc. from the gateway 200.

The battery 140 may supply power required for an overall operation of the network camera 100. The battery 140 may supply power of a predetermined level.

For convenience of description, FIG. 1 illustrates only one network camera 100, however, a surveillance system according to another exemplary embodiment may include a plurality of network cameras each having the same or similar structure as that described in FIG. 1.

The gateway 200 may include a second controller 210, a memory 220, and the second RF module 230.

The second controller 210 may control an overall operation of the gateway 200.

The second controller 210 may periodically transmit a beacon, possibly, through the second RF module 230. The beacon may include an identifier of the network camera 100 to which is the beacon is transmitted, channel information about a next channel, etc. The second controller 210 may store in the memory 220 channel information about one or more indexed channels among 100 channels obtained by dividing a frequency range of about 2.4 to about 2.5 GHz by a predetermined bandwidth, for example, 1 MHz, and control an operation of the second RF module 230 such that information about the indexed channels may be sequentially included into a beacon and transmitted to the network camera 100.

When receiving a channel check request from the network camera 100, the second controller 210 may control an operation of the second RF module 230 such that a channel check response may be transmitted to the network camera 100 in response to the channel check request.

The memory 220 stores channel information about one or more indexed channels, an image signal received from the network camera 100, etc. Hereinafter, an operation of the memory 220 of the gateway 200 according to an exemplary embodiment is described below with reference to FIG. 2.

At least one of the first controller 120 of the network camera 100 and the second controller 210 of the gateway 200 as described above with reference to FIGS. 1 and 2 may be embodied as various numbers of hardware, software and/or firmware structures that execute respective functions described above, according to an exemplary embodiment. For example, at least one of the first controller 120 and the second controller 210 may use a direct circuit structure, such as a memory, processing, logic, a look-up table, etc. that may execute the respective functions through controls of one or more microprocessors or other control apparatuses. Also, at least one of the first controller 120 and the second controller 210 may be specifically embodied by a module, a program, or a part of code, which contains one or more executable instructions for performing specified logic functions, and executed by one or more microprocessors or other control apparatuses. Also, at least one of the first controller 120 and the second controller 210 may further include a processor such as a central processing unit (CPU) that performs the respective functions, a microprocessor, or the like. Also, at least part of functions of one of the first controller 120 and the second controller 210 may be performed by the other of the first controller 120 and the second controller 210. Further, although a bus is not illustrated in each of FIGS. 1 and 2, communication between the components, modules, elements or units illustrated therein may be performed through the bus. Functional aspects of the first controller 120 and the second controller 210 may be implemented in algorithms that execute on one or more processors. Furthermore, the first controller 120 and the second controller 210 may employ any number of related art techniques for electronics configuration, signal processing and/or control, data processing and the like.

The first RF module 130 of the network camera 100 and the second RF module 230 of the gateway 200 as described above with reference to FIGS. 1 and 2 may be implemented by an RF signal interface hardware, according to an exemplary embodiment.

FIG. 2 is a diagram for explaining a channel table, according to an exemplary embodiment.

Referring to FIG. 2, the memory 220 of the gateway 200 according to an exemplary embodiment stores channel information about 15 indexed channels in total, for example.

The memory 220 may index 15 channels among 100 channels each having a bandwidth of 1 MHz between about 2.4 GHz and about 2.5 GHz, and store an identifier of a channel corresponding to each index as channel information.

The second controller 210 may select 15 channels among 100 channels corresponding to the ISM band in order or at random, store the same as channel information, select a channel of small interference among the 100 channels, and store the same as channel information, but is not limited thereto.

An index may be identified by using each of numbers 1 to 15, and an identifier of a channel may be identified by using a number indicating a channel, but is not limited thereto. For example, as illustrated in FIG. 2, a channel No. 2 may be selected by using a first index [1], and a channel No. 9 may be selected by using a second index [2].

Referring to FIG. 1 again, the second RF module 230 may transmit a signal to the network camera 100 and receive a signal from the network camera 100 under control of the second controller 210. For example, the second RF module 230 may receive a channel check request signal, an image signal, etc. from the network camera 100, and transmit a beacon, a channel check response signal, etc. to the network camera 100. An operation of the second RF module 230 of the gateway 200 according to an exemplary embodiment is described below with reference to FIG. 3.

Figure 3:
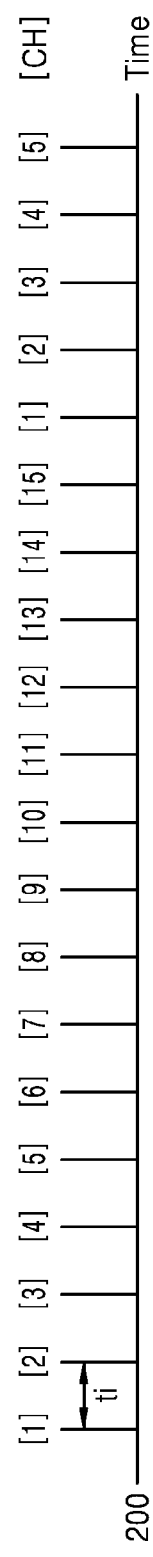
FIG. 3 is a diagram for explaining a channel change, according to an exemplary embodiment.

FIG. 3 is a diagram for explaining a channel change, according to an exemplary embodiment.

Referring to FIG. 3, when changing a channel, the second RF module 230 of the gateway 200 according to an exemplary embodiment transmits a beacon including channel information about a next channel to the network camera 100. The second RF module 230 may transmit a total of 15 beacons to the network camera 100 periodically, sequentially, and repeatedly.

A beacon transmission period of the second RF module 230 is a beacon interval time "ti", which is constant, and for example, may be equal to or less than 250 ms (millisecond).

A beacon transmission sequence of the second RF module 230 may be the same as a channel index sequence [CH], but is not limited thereto.

The second RF module 230 may repeatedly perform a process of transmitting 15 beacons in the channel index sequence [CH].

Referring to FIG. 1 again, the monitoring device 300 includes at least one of a wired monitoring device 310 and a wireless monitoring device 320.

The monitoring device 300 may display and store received image signals. The monitoring device 300 may include at least one processor. The monitoring device 300 may be driven in a form included in other hardware devices such as a microprocessor or a general computer system. For the wired monitoring device 310, a personal computer (PC), etc. may be used. For the wireless monitoring device 320, a mobile terminal, etc. may be used.

A channel change operation depending on normal beacon reception of a camera system according to an exemplary embodiment is described below with reference to FIG. 4.

Figure 4:
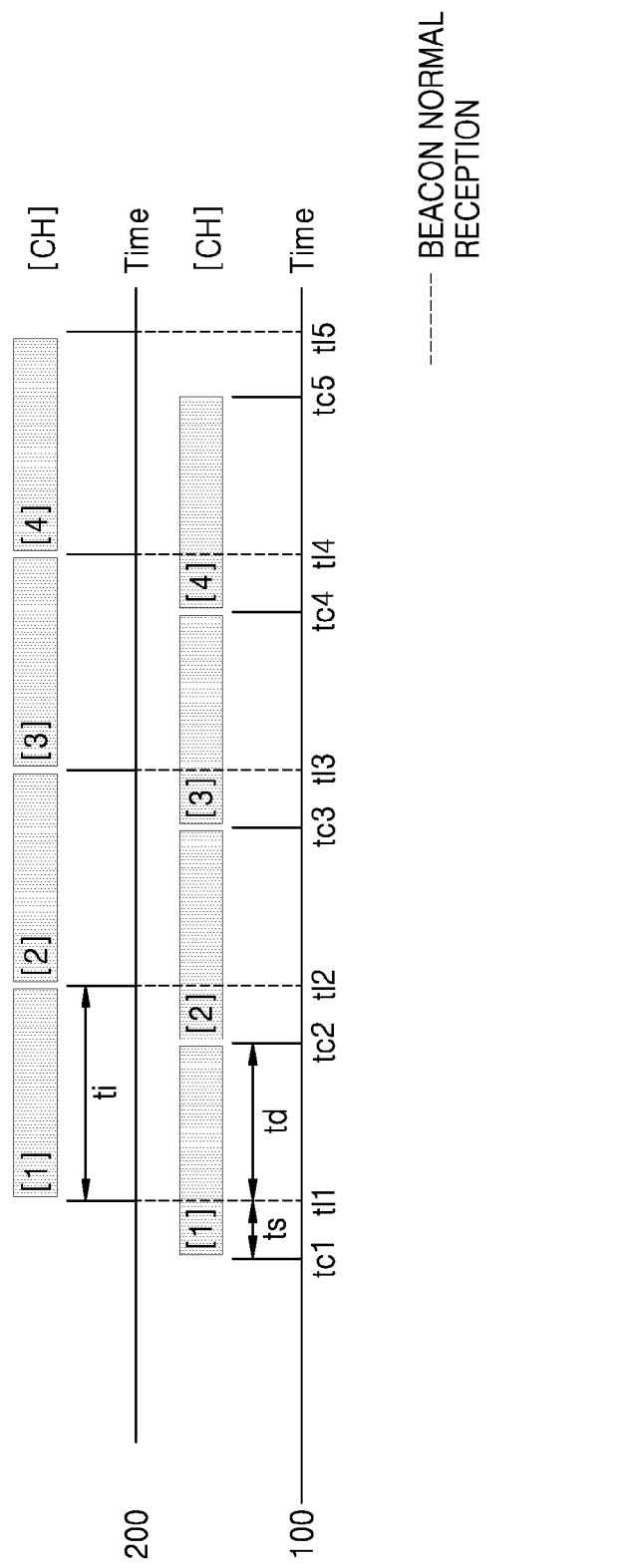
FIG. 4 is a diagram for explaining a channel change operation performed by a camera system, according to an exemplary embodiment.

FIG. 4 is a diagram for explaining a channel change operation performed inside a camera system, according to an exemplary embodiment.

Referring to FIG. 4, after the network camera 100 changes a channel at a channel change time "tc", the gateway 200 transmits a beacon including channel information about a next channel to the network camera 100 while subsequently changing the channel.

For example, after the network camera 100 changes a current channel to a channel corresponding to a first index [1] at a first channel change time "tc1", the gateway 200 may change the current channel to the channel corresponding to the first index [1] and transmit a beacon including channel information about a next channel to the network camera 100 at a first beacon listen time "tl1" that has elapsed by a beacon standby time "ts" from the first channel change time "tc1".

A packet configuration of a beacon according to an exemplary embodiment is described below with reference to FIG. 5.

FIG. 5 is a diagram for explaining a packet configuration of a beacon, according to an exemplary embodiment.

Referring to FIG. 5, a beacon packet includes a preamble field, an address field, a length field, a head (CMD) field, a payload field, and a cyclic redundancy code (CRC) field.

The payload field includes one or more sub fields. For example, the payload field may include a network camera identifier sub field "CAM ID", a time stamp sub field "Time stamp", a channel dwell time sub field "dwell time", and a next channel information sub field "next RF ch" for channel information about a next channel.

For example, a beacon transmitted from the gateway 200 to the network camera 100 at the first beacon listen time "tl1" may include a network camera identifier sub field "CAM ID" having a size of 1 byte and including identifier information of the network camera 100, a time stamp sub field "Time stamp" having a size of 1 byte and including information for synchronization between a plurality of gateways, a channel dwell time sub field "dwell time" having a size of 1 byte and including information representing that a next channel dwell time is 250 ms, and a next channel information sub field "next RF ch" having a size of 1 byte and including information regarding a second index [2] or information regarding a channel No. 9 corresponding to the second index [2].

Subsequently, referring to FIG. 4 again, the network camera 100 changes the current channel (i.e., the channel of the first index [1]) to a next channel based on the channel information about the next channel included in the beacon.

For example, the network camera 100 may change the current channel to a channel corresponding to the second index [2] based on the channel information about the next channel included in the beacon at a second channel change time "tc2" that has elapsed by a channel dwell time "td" from the first beacon listen time "tl1". A sum of the beacon standby time "ts" and the channel dwell time "td" may be the same as the beacon interval time "ti".

As described above, the network camera 100 may be normally connected with the gateway 200 by changing to the next channel based on a beacon normally received from the gateway 200.

Figure 6:
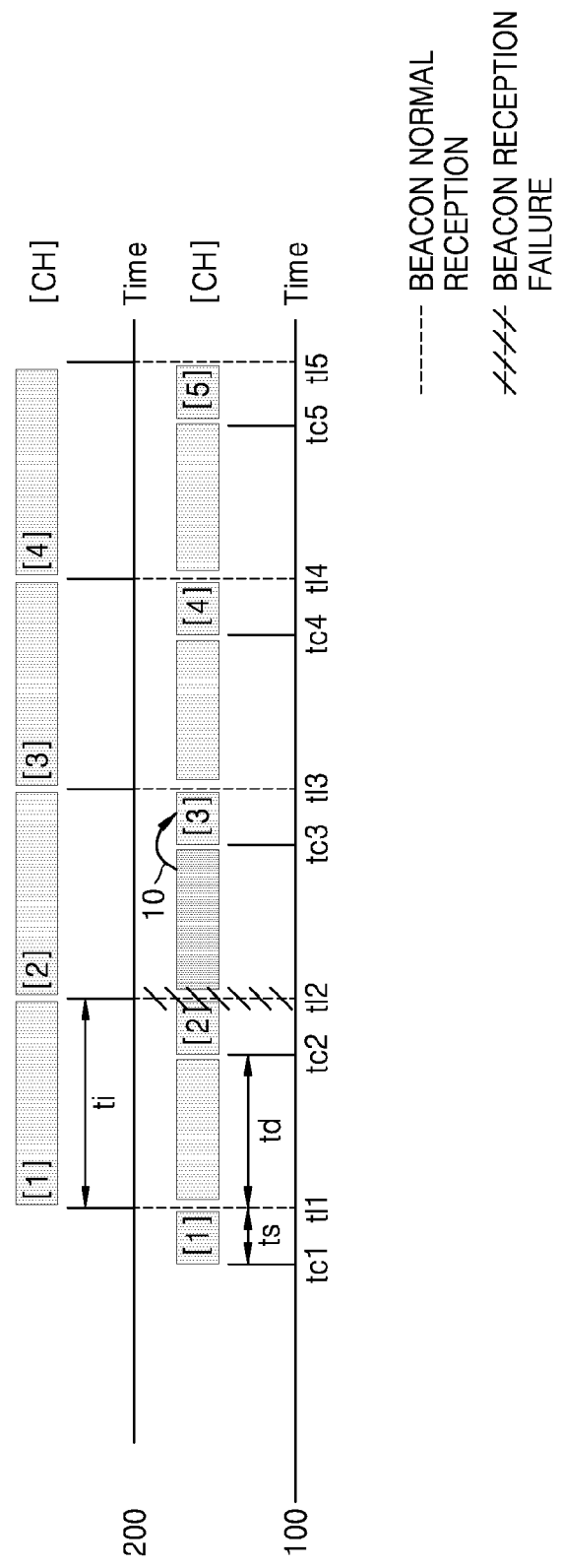
FIG. 6 is a diagram for explaining an operation of a camera system that corresponds to a beacon reception failure, according to an exemplary embodiment.

FIG. 6 is a diagram for explaining an operation of a camera system having a beacon reception failure, according to an exemplary embodiment.

The network camera 100 according to an exemplary embodiment may have a memory (not shown) which stores in advance the same channel information as the channel information stored in the memory 220 of the gateway 200.

Referring to FIG. 6, when failing to receive a beacon transmitted from the gateway 200 at a second beacon listen time "tl2", the network camera 100 may perform an operation of changing to a predetermined channel, for example, a channel corresponding to a third index [3] at a third channel change time "tc3". In this case, since the network camera 100 uses the same channel information as channel information stored in the memory 220 of the gateway 200, the channel changed by the network camera 100 at the third channel change time "tc3" is the same as a channel changed by the gateway 200 at a third beacon listen time "tl3", so that the network camera 100 may be normally connected with the gateway 200.

As described above, even when the network camera 100 according to an exemplary embodiment fails to receive a beacon one time, the network camera 100 may be normally connected with the gateway 200 through change to a next channel. An operation of a camera system in the case where the network camera 100 according to an exemplary embodiment fails to receive a beacon two times or more is described below with reference to FIG. 7.

Figure 7:
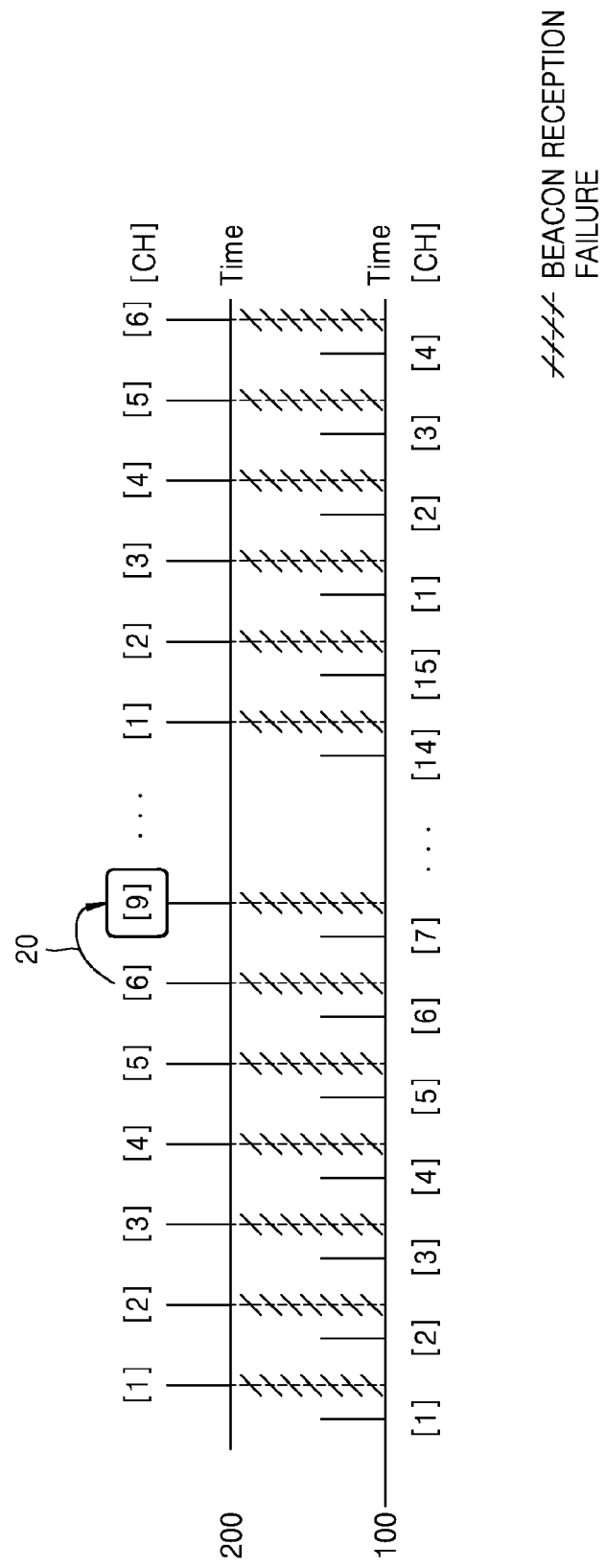
FIG. 7 is a diagram for explaining an operation of a camera system that corresponds to a beacon reception failure, according to another exemplary embodiment.

FIG. 7 is a diagram for explaining an operation of a camera system that corresponds to a beacon reception failure, according to another exemplary embodiment.

Referring to FIG. 7, in the case of occurrence of an exceptional circumstance in which channels are not sequentially changed like the case where the network camera 100 fails to receive a beacon transmitted from the gateway 200 two times or more and the gateway 200 reboots, etc., even when the network camera 100 changes a channel based on the same channel information as channel information stored in the memory 220 of the gateway 200, the network camera 100 may not be normally connected with the gateway 200.

According to exemplary embodiments described with reference to FIGS. 8 to 16, such a problem may be solved as follows.

Figure 8:
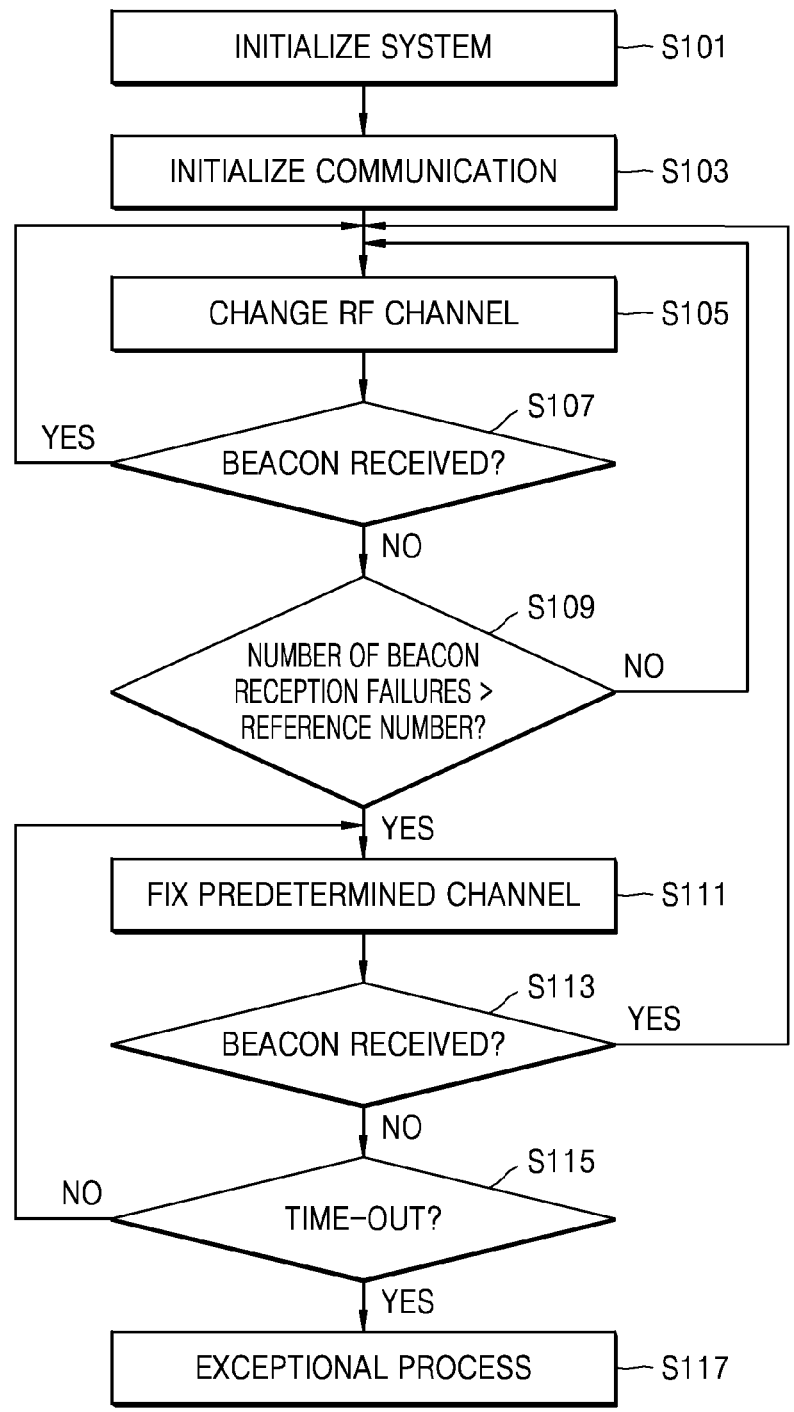
FIG. 8 is a flowchart for explaining a method of controlling a camera system, according to an exemplary embodiment.

FIG. 8 is a flowchart for explaining a method of controlling a camera system, according to an exemplary embodiment.

Referring to FIG. 8, the network camera 100 performs system initialization (S101) and communication initialization (S103). To perform the communication initialization, the network camera 100 may perform at least one of beacon synchronization and change channel setting.

Subsequently, the network camera 100 changes a channel at a channel change time (S105). The channel may be an RF channel. As described with reference to FIG. 6, the network camera 100 may change a channel at a channel change time based on the same channel information as the channel information stored in advance in the gateway 200, but is not limited thereto.

Subsequently, the network camera 100 determines whether a beacon is received at a time that has elapsed by a beacon standby time from the channel change time (S107).

When receiving a beacon, the network camera 100 may change a current channel at the channel change time based on channel information about a next channel included in the beacon.

When failing to receive a beacon, the network camera 100 compares the number of beacon reception failures with a reference number (S109). The reference number may be determined within the number of indexes of channel information stored in advance. For example, the reference number may be determined as three times, which is less than fifteen times in case of the channel table of FIG. 2. The reference number may change depending on a wireless interference environment, but is not limited thereto.

When the number of beacon reception failures is less than the reference number, for example, the number of beacon reception failures is two times, the network camera 100 may change the current channel to a channel corresponding to an index next to the next index. That is, the network camera 100 may change the current channel to a channel corresponding to the number of beacon reception failures.

When the number of beacon reception failures is greater than the reference number, for example, the number of beacon reception failures is four times, the network camera 100 sets the channel to a predetermined channel (S111). The predetermined channel may be at least one of an arbitrary channel, a channel corresponding to a last index, and a channel of lowest interference, but is not limited thereto. For example, the network camera 100 may set the channel to a channel corresponding to a fifteenth index [15], which is the last index.

Subsequently, the network camera 100 determines whether a beacon is received (S113). In this case, the network camera 100 may determine whether a beacon including channel information about a next channel of the predetermined channel is received.

When receiving the beacon including the channel information about the next channel of the predetermined channel, the network camera 100 may change the channel at a channel change time based on the channel information about the next channel included in the beacon.

When failing to receive the beacon including the channel information about the next channel of the predetermined channel, the network camera 100 determines whether time-out occurs (S115). In the case where the time-out does not occur, the network camera 100 maintains the predetermined channel (S111), and in the case of the time-out, the network camera 100 performs an exception process (S117). The exception process may denote a process except a channel change or channel setting, but is not limited thereto.

Figure 9:
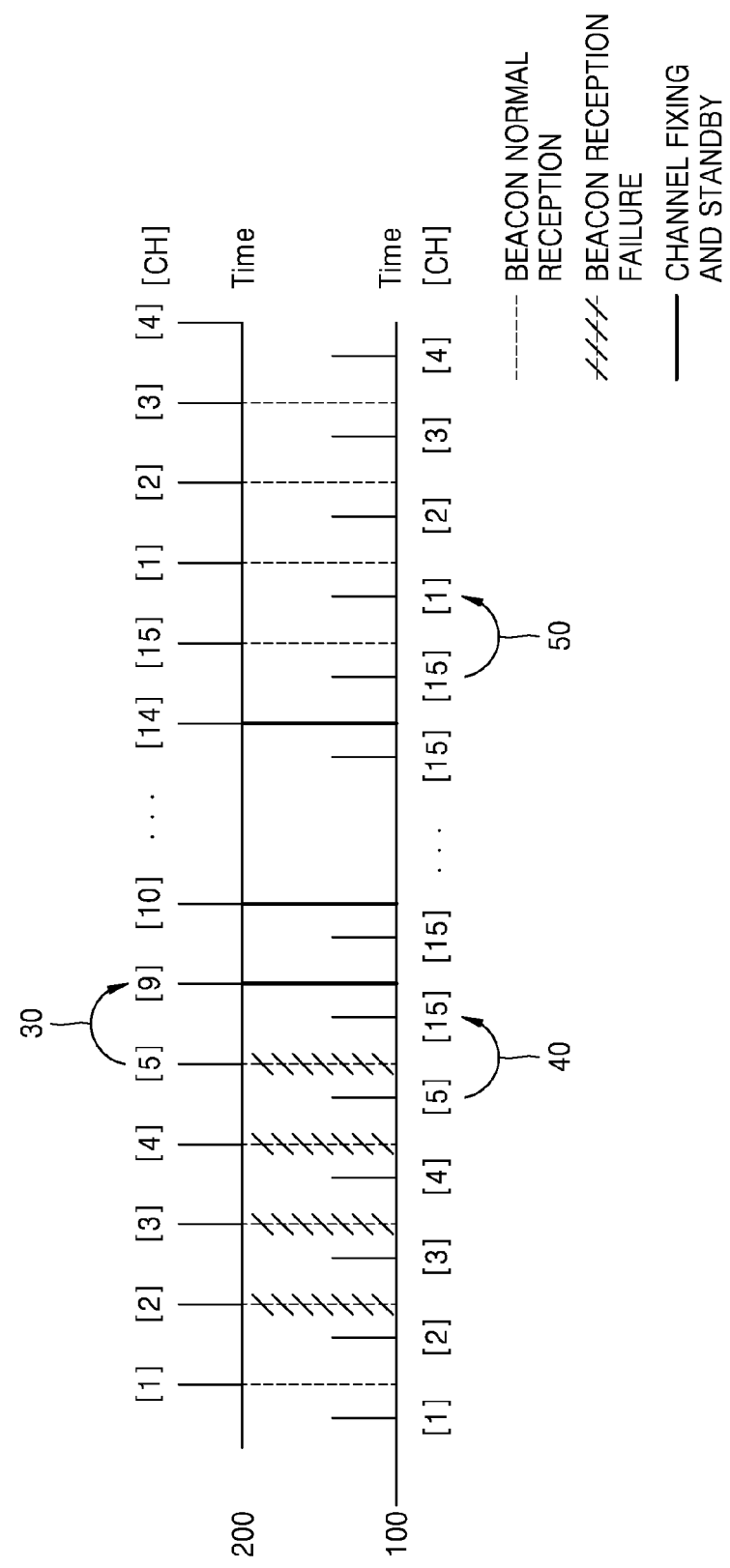
FIG. 9 is a diagram for explaining an operation of a camera system that corresponds to a beacon reception failure, according to still another exemplary embodiment.

FIG. 9 is a diagram for explaining an operation of a camera system that corresponds to a beacon reception failure, according to still another exemplary embodiment.

Referring to FIG. 9, when receiving a beacon including channel information about a next channel from the gateway 200 while maintaining a channel corresponding to the first index [1] of the channel table of FIG. 2, the network camera 100 may change the channel to a channel corresponding to the second index [2] when a channel change time arrives.

After that, the number of beacon reception failures of the network camera 100 becomes four times, which is greater than the reference number, the network camera 100 may perform channel setting 40 to a predetermined channel, for example, a channel corresponding to a fifteenth index [15].

In the case where the channel setting 40 is performed, even when an exceptional circumstance 30 in which a channel of the gateway 200 does not sequentially change occurs, the network camera 100 maintains the channel setting 40.

After that, when receiving a beacon including channel information about a next channel of the predetermined channel, for example, channel information corresponding to the first index [1], the network camera 100 may stop the channel setting 40 and perform channel changing 50 to the channel corresponding to the first index [1] when a channel change time arrives.

As described above, the network camera 100 according to an exemplary embodiment may be normally connected with the gateway 200 through the channel setting 40 and the channel changing 50 even when failing to receive a beacon two times or more. Description of portions that are the same as or similar to the above described portions is omitted or briefly made.

Figure 10:
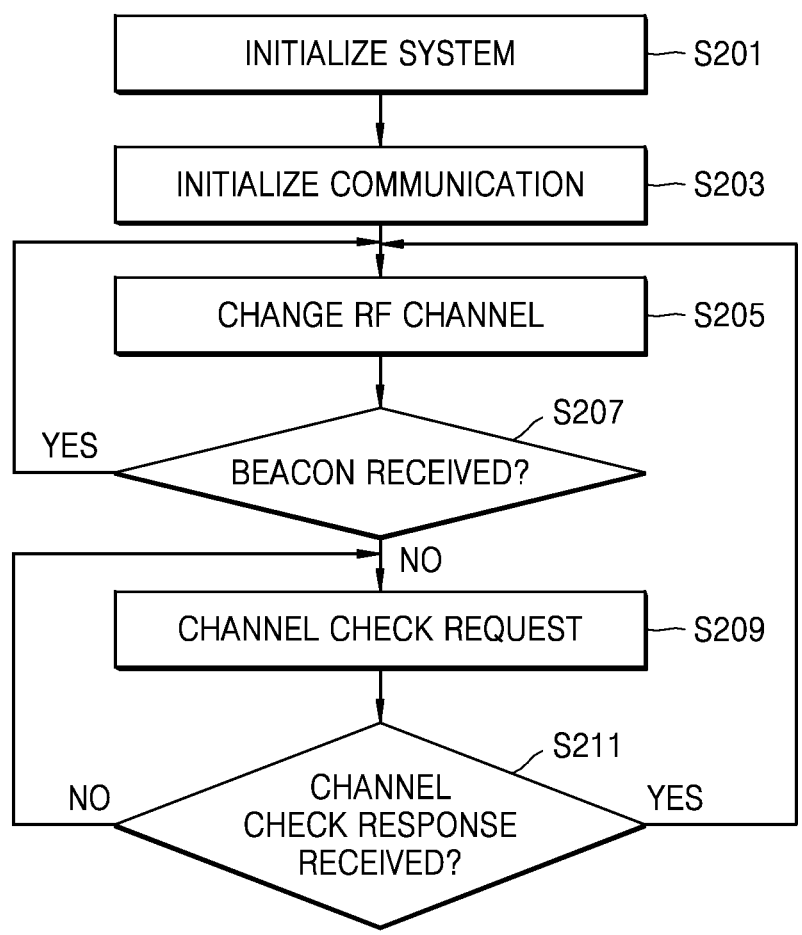
FIG. 10 is a flowchart for explaining a method of controlling a camera system, according to another exemplary embodiment.

FIG. 10 is a flowchart for explaining a method of controlling a camera system, according to another exemplary embodiment.

Referring to FIG. 10, the network camera 100 performs system initialization (S201) and communication initialization (S203).

Subsequently, the network camera 100 changes a channel at a channel change time (S205).

The network camera 100 determines whether a beacon is received at a time that has elapsed by a beacon standby time from the channel change time (S207).

When receiving a beacon, the network camera 100 may change a channel at a channel change time based on channel information about a next channel included in the beacon.

In the case of failing to receive the beacon, when a channel check request time "tr" arrives, the network camera 100 transmits a channel check request to the gateway 200 (S209). For example, the channel check request includes a request for channel information about a next channel.

For another example, the channel check request may include at least one of the request for channel information about the next channel and information about a next channel. In this case, for the channel check request, the network camera 100 may transmit, sequentially or at random, requests for information about all indexed channels stored in advance to the gateway 200. Alternatively, for the channel check request, the network camera 100 may transmit, sequentially or at random, requests for a portion of information about all indexed channels stored in advance to the gateway 200.

Subsequently, the network camera 100 determines whether a channel check response is received from the gateway 200 (S211). The channel check response corresponding to the channel check request includes channel information about the next channel.

In this case, transmission of channel check requests and the channel check responses corresponding thereto for all channels may be performed within a beacon interval time "ti". For example, in the case where the beacon interval time "ti" is 250 ms and the number of all indexed channels is 15, the network camera 100 and the gateway 200 may complete transmission of one channel check request and a corresponding channel check response within 16.67 ms.

When failing to receive a channel check response, the network camera 100 may retransmit a channel check request.

When receiving a channel check response, the network camera 100 may change a current channel according to channel information about the next channel included in the channel check response.

Figure 11:
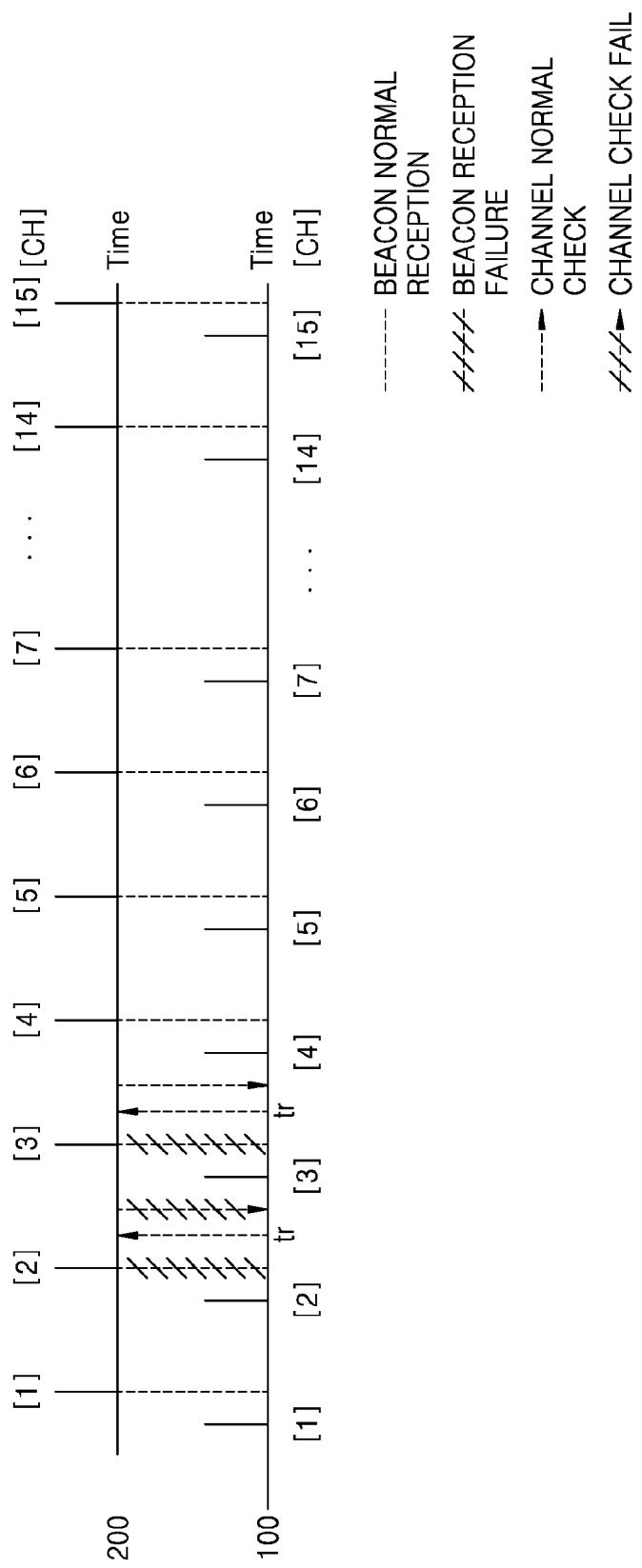
FIG. 11 is a diagram for explaining an operation of a camera system that corresponds to a beacon reception failure, according to further another exemplary embodiment.

FIG. 11 is a diagram for explaining an operation of a camera system that corresponds to a beacon reception failure, according to further another exemplary embodiment.

Referring to FIG. 11, when receiving a beacon including channel information about a next channel from the gateway 200 while maintaining a channel corresponding to the first index [1], the network camera 100 may change the channel to a channel corresponding to the second index [2] when a channel change time arrives.

After that, when failing to receive a beacon including channel information about a next channel from the gateway 200 while maintaining the channel corresponding to the second index [2], the network camera 100 transmits a channel check request to the gateway 200 when a channel check request time "tr" arrives. The channel check request may include a request for channel information about a next channel, but is not limited thereto. The channel check request time "tr" may change depending on a wireless interference environment, but is not limited thereto. A packet configuration of a channel check request according to an exemplary embodiment is described below with reference to FIG. 12.

FIG. 12 is a diagram illustrating a packet configuration for a channel check request, according to an exemplary embodiment.

Referring to FIG. 12, the channel check request includes a preamble field, an address field, a length field, a head (CMD) field, a payload field, and a cyclic redundancy code (CRC) field.

The payload field includes one or more sub fields. For example, the payload field may include a network camera identifier sub field "CAM ID".

For example, a channel check request transmitted from the network camera 100 to the gateway 200 at a channel check request time "tr" may include a network camera identifier sub field "CAM ID" having a size of 1 byte and including identifier information about the network camera 100.

Referring to FIG. 11 again, when failing to receive a channel check response corresponding to a channel check request, the network camera 100 may retransmit the channel check request to the gateway 200. For example, when a channel check request time "tr" arrives while maintaining a channel corresponding to a third index [3], the network camera 100 may retransmit the channel check request to the gateway 200.

When receiving the channel check response corresponding to the channel check request, the network camera 100 may change the channel to a channel corresponding to a fourth index [4] when a channel change time arrives. A packet configuration of a channel check response according to an exemplary embodiment is described below with reference to FIG. 13.

FIG. 13 is a diagram illustrating a packet configuration for a channel check response, according to an exemplary embodiment.

Referring to FIG. 13, a channel check response packet includes a preamble field, an address field, a length field, a head (CMD) field, a payload field, and a cyclic redundancy code (CRC) field.

The payload field includes one or more sub fields. For example, the payload field may include a network camera identifier sub field "CAM ID", a time stamp sub field "Time stamp", a channel dwell time sub field "dwell time", and a next channel information sub field "next RF ch" for channel information about a next channel.

For example, a beacon transmitted from the gateway 200 to the network camera 100 at the first beacon listen time "tl1" may include a network camera identifier sub field "CAM ID" including identifier information of the network camera 100 that has a size of 1 byte, a time stamp sub field "Time stamp" having a size of 1 byte and including information for synchronization between a plurality of gateways, a channel dwell time sub field "dwell time" having a size of 1 byte and including information representing that a next channel dwell time is 250 ms, and a next channel information sub field "next RF ch" having a size of 1 byte and including information regarding a second index [2] or information regarding a channel No. 41 corresponding to the fourth index [4].

As described above, even when failing to receive a beacon, the network camera 100 according to an exemplary embodiment may be normally connected with the gateway 200 through the channel check request and the channel check response. According to the exemplary embodiment described with reference to FIGS. 10 and 11, a standby time due to the channel setting reduces and thus the performance of the camera system may improve.

Figure 14:
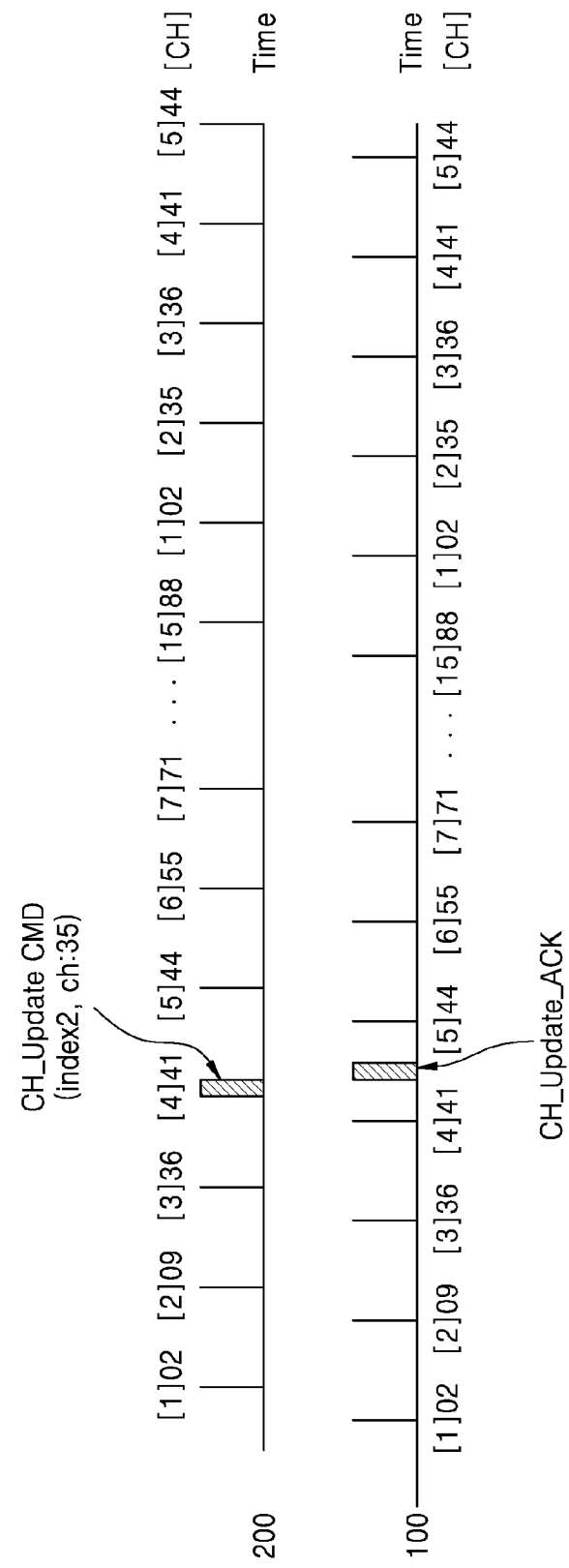
FIG. 14 is a diagram for explaining channel update, according to an exemplary embodiment.

FIG. 14 is a diagram for explaining channel update, according to an exemplary embodiment.

The gateway 200 may change indexed channel information stored in the memory 220. For example, the gateway 200 may determine reception sensitivities of 100 channels, respectively, select at least one channel having smaller wireless interference than those of 15 channels stored in the memory 220, and change a portion of the 15 channels stored in the memory 220 to the selected channel.

Referring to FIG. 14, the gateway 200 may transmit a channel update command CH_Update_CMD to the network camera 100. The channel update command CH_Update_CMD may include, for example, information that changes a channel corresponding to the second index [2] to a channel No. 35. A packet configuration of a channel update command according to an exemplary embodiment is described below with reference to FIG. 15.

FIG. 15 is a diagram illustrating a packet configuration for channel update, according to an exemplary embodiment.

Referring to FIG. 15, a channel update command packet includes a preamble field, an address field, a length field, a head (CMD) field, a payload field, and a cyclic redundancy code (CRC) field.

The payload field includes one or more sub fields. For example, the payload field may include a network camera identifier sub field "CAM ID", a time stamp sub field "Time stamp", a channel dwell time sub field "dwell time", a target channel index information sub field "RF ch[index]", and a target channel information sub field "RF ch".

For example, a channel update command transmitted from the gateway 200 to the network camera 100 may include a network camera identifier sub field "CAM ID" including identifier information of the network camera 100 that has a size of 1 byte, a time stamp sub field "Time stamp" having a size of 1 byte and including information for synchronization between a plurality of gateways, a channel dwell time sub field "dwell time" having a size of 1 byte and including information representing that a next channel dwell time is 250 ms, a target channel index information sub field "RF ch[index]" having a size of 1 byte and including information representing an update target channel index is a second index, and an updated channel information sub field "RF ch" including information representing an updated channel is a channel No. 35.

Referring to FIG. 14 again, the network camera 100 may transmit a channel update response CH_Update_ACK to the gateway 200 in response to the channel update command CH_Update_CMD received from the gateway 200.

When receiving the channel update response CH_Update_ACK that corresponds to the channel update command CH_Update_CMD from the network camera 100, the gateway 200 may transmit updated channel information from a new channel change period after a current channel change period ends as illustrated in FIG. 14. A packet configuration of a channel update response according to an exemplary embodiment is described below with reference to FIG. 16.

FIG. 16 is a diagram illustrating a packet configuration for channel update, according to another exemplary embodiment.

Referring to FIG. 16, a channel update response packet includes a preamble field, an address field, a length field, a head (CMD) field, a payload field, and a cyclic redundancy code (CRC) field.

The payload field includes one or more sub fields. For example, the payload field may include a network camera identifier sub field "CAM ID", a target channel index information sub field "RF ch[index]", and an updated channel information sub field "RF ch".

For example, a channel update command transmitted from the gateway 200 to the network camera 100 may include a network camera identifier sub field "CAM ID" having a size of 1 byte and including identifier information of the network camera 100, an object channel index information sub field "RF ch[index]" having a size of 1 byte and including information representing an update target channel index is a second index, and an updated channel information sub field "RF ch" including information representing an updated channel is a channel No. 35 which is not included in the channel table of FIG. 2. However, the updated channel may be a different channel originally included in the channel table of FIG. 2. For example, by the channel update, the channel index 2 may be changed from the channel No. 09 to the channel No. 88 which is the last channel number in the channel table of FIG. 2 according to channel interference environment change.

As described above, a camera system according to an exemplary embodiment may perform communication suitable for a wireless interference environment in real-time by performing channel update.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

Although the inventive concept has been described with reference to exemplary embodiments illustrated in the drawings, these are provided for an exemplary purpose only, and those of ordinary skill in the art will understand that various modifications and modifications of exemplary embodiments may be made therein. Therefore, the spirit and scope of the inventive concept should be defined by the following claims.

What is claimed is:

1. A camera system comprising:
   a radio frequency (RF) module connected to a gateway through a channel, and configured to receive, from the gateway, a beacon comprising channel information about a next channel for connection to the gateway; and
   a controller configured to compare a number of beacon reception failures with a reference number in response to failing to receive the beacon at the RF module, set the channel to a predetermined channel for connection to the gateway if the number of beacon reception failures is greater than or equal to the reference number, and change the channel to the next channel in response to receiving the beacon.

2. The camera system of claim 1, wherein the predetermined channel is a channel with lowest interference from among a plurality of channels for connection to the gateway.

3. The camera system of claim 1, further comprising a memory configured to store channel information about a plurality of channels for connection to the gateway in a predetermined order of the plurality of channels, and
   wherein, in response to the receiving the beacon, the controller is configured to change the channel to another channel among the plurality of channels in the predetermined order.

4. The camera system of claim 3, wherein after setting the channel to the predetermined channel, if the RF module receives the beacon comprising channel information about a channel next to the predetermined channel according to the channel information about the plurality of channels, the controller is configured to change the predetermined channel to the channel next to the predetermined channel.

5. The camera system of claim 3, wherein the reference number is equal to or less than a number of the plurality of channels.

6. The camera system of claim 3, wherein the channel information about the plurality of channels is updated such that the predetermined order is changed or an existing channel among the plurality of channel is replaced by a different channel not included in the plurality of channels.

7. The camera system of claim 6, wherein the controller is configured to apply the updated channel information for connection to the gateway after the channel is changed to the last channel among the plurality of channels in the predetermined order.

8. The camera system of claim 1, wherein the controller is further configured to transmit a channel check request to the gateway in response to failing to receive the beacon, receive a channel check response that corresponds to the channel check request from the gateway through the RF module, and change the channel according to channel information about a different channel included in the channel check response.

9. The camera system of claim 8, wherein the controller is configured to transmit the channel check request and receive the channel check response within a beacon interval time.

10. The camera system of claim 1, wherein if the number of beacon reception failures is less than the reference number, the controller is configured to change the channel to another channel in a predetermined order of a plurality of channels.

11. The camera system of claim 10, further comprising the gateway which stores a channel table comprising channel information about the plurality of channels in the predetermined order, and
wherein the gateway is configured to transmit the beacon to the RF module based on the channel table.

12. A camera comprising:
a radio frequency (RF) module connected to a gateway through a channel, and configured to receive a beacon periodically sent from the gateway, the beacon comprising channel information about a next channel to which the channel is to be changed for connecting the camera and the gateway; and
a controller configured to determine whether the beacon is received at the RF module, and change the channel to another channel based on at least one of:
a predetermined order of a plurality of channels including the other channel;
a status of receiving the beacon at the RF module; and
a channel check response received from the gateway in response to a channel check request sent from the radio frequency module, the channel check response comprising channel information about one of the plurality of channels.

13. The camera of claim 12, wherein the controller is further configured to determine a number of failures in receiving the beacon, and change the channel to the other channel in a different manner according to the number of failures.

14. The camera of claim 13, wherein, if the number of failures is less than a reference number, the controller changes the channel to the other channel in the predetermined order of the plurality of channels, and
wherein, if the number of failures is greater than or equal to the reference number, the controller sets the channel to a predetermined channel among the plurality of channels until the beacon comprising channel information about the predetermined channel is received at the RF module.

15. The camera of claim 12, wherein the controller is configured to determine occurrence of at least one failure in receiving the beacon, and
wherein if the controller determines the occurrence of the failure, the controller changes the channel to one of:
a predetermined channel selected from among the plurality of channels;
a channel which is to be selected according to the predetermined order when the failure does not occur; and
the one of the plurality of channels of which the channel information is included the channel check response.

16. The camera of claim 12, wherein the controller is further configured to update the channel information about the plurality of channels such that the predetermined order is changed or an existing channel among the plurality of channel is replaced by a different channel not included in the plurality of channels.

17. A method of changing a channel through which a camera is connected to a gateway, the method comprising:
receiving a beacon which is periodically sent from the gateway and comprises channel information about a next channel to which the channel is to be changed for connecting the camera and the gateway; and
determining whether the beacon is received at the RF module, and changing the channel to another channel based on at least one of:
a predetermined order of a plurality of channels including the other channel;
a status of receiving the beacon at the RF module; and
a channel check response received from the gateway in response to a channel check request sent from the radio frequency module, the channel check response comprising channel information about one of the plurality of channels.

18. The method of claim 17, further comprising:
determining a number of failures in receiving the beacon; and
changing the channel to the other channel in a different manner according to the number of failures.

19. The method of claim 18, wherein, if the number of failures is less than a reference number, the channel is changed to the other channel in the predetermined order of the plurality of channels, and
wherein, if the number of failures is greater than or equal to the reference number, the channel is set to a predetermined channel among the plurality of channels until the beacon comprising channel information about the predetermined channel is received at the RF module.

20. The method of claim 17, further comprising determining occurrence of at least one failure in receiving the beacon,
wherein in response to determining that the occurrence of the failure, the channel is changed to one of:
a predetermined channel selected from among the plurality of channels;

a channel which is to be selected according to the predetermined order when the failure does not occur; and the one of the plurality of channels of which the channel information is included the channel check response.

\* \* \* \* \*